Patented Nov. 26, 1929

1,737,255

UNITED STATES PATENT OFFICE

PHILIP M. McKENNA, OF LATROBE, PENNSYLVANIA, ASSIGNOR TO VANADIUM ALLOYS STEEL COMPANY, OF LATROBE, PENNSYLVANIA, A CORPORATION OF PENNSYLVANIA

HARD ALLOY AND PROCESS OF MANUFACTURING THE SAME

No Drawing. Application filed January 22, 1929. Serial No. 334,364.

The object which I have in view is the provision of an alloy having a hardness approaching that of a diamond and at the same time having sufficient strength to withstand mechanical shock to a degree approaching that of steel.

Such an alloy is manifestly applicable to many important purposes, such for instance as material for lathe-tools, milling cutters, gear-cutters, inserts for rotary rock drills such as are used in drilling oil wells, for core drills for geological examinations, for dressing grinding wheels, and for bearings for fine instruments.

A method for forming hard alloys which has been used comprises the alloying together of tungsten carbide and cobalt, iron, nickel or other metals which are reducible from their oxides by hydrogen. The alloy is formed either by pressing and sintering or by melting the materials together.

Such an alloy, while highly useful in many ways, is too brittle for the general purposes above mentioned, and in its preparation by the sintering method is subject to the formation of cracks, blow holes and other defects.

My improved hard alloy is composed of tungsten, beryllium and carbon, and I have found it much superior for the uses above mentioned than any other hard alloy of which I have knowledge.

Thus I have found my improved alloy highly satisfactory when comprising tungsten carbide (containing 2.82% carbon) eighty parts and beryllium four and one-half parts.

One method by which my hard alloy may be formed is as follows.

Pure tungsten in finely powdered form is first carburized as by intimately mixing the tungsten with carbon black and heating the mixture to about 2350 degrees Fahr. The heating is performed in a graphite crucible and in a neutral atmosphere. Sufficient carbon black is used to produce the required percentage of carbon which is preferably below 3% but which may vary up to 7%.

The beryllium metal, in a comminuted form sufficient to pass through a sixty mesh to the inch screen, is then added to the tungsten carbide and the mixture thoroughly ground, as for instance for eight hours in a steel ball mill.

The resultant material, which is in an extremely finely powdered form, is pressed into bars or shapes, like that which the product is to present, by pressure.

Thus I may press the powder in a steel mold provided with a movable plunger and squeeze the same in a vise or hydraulic press, employing a pressure of about 45,000 pounds per square inch.

After the squeezing operation has been completed the pressed body is removed from the mold and it is found that it is sufficiently coherent to be handled without breaking.

The body is then inserted in a graphite receptacle of slightly larger internal size than the body, and said receptacle is then packed in charcoal in a suitable crucible or other container and heated to about 2350 degrees Fahr., the temperature being maintained for approximately seven hours.

When cooled the pressed sintered body is still weak and may be shaped by grinding, sawing or the like about as easily as limestone.

At this stage the body may be formed by grinding or other suitable means to the desired shape, as for instance a lathe tool.

The body is then placed in a graphite crucible or container and heated nearly to but not quite to its melting point, say to about 1400 degree centigrade, and the result is a very hard alloy of much greater strength than that of other alloys now known. The heating must be performed in a non-oxidizing atmosphere.

For example, a lathe tool formed of my alloy three-eighths of an inch square and two inches in length cut steel for fifteen minutes at a speed of one hundred and forty feet per minute with a chip area of over one percent of the cross sectional area of the tool. The surface left was smooth and shiny. It will be noted that this was a speed several times that employed with tools of high speed steel.

It is of course apparent that instead of using tungsten carbide and beryllium metal, I may use beryllium carbide and tungsten.

Again I may melt the materials together instead of sintering them.

My improved alloy does not develop cracks, blow holes or other defects in heating or cooling, and does not warp in heating. This is due to the use of beryllium. It has a hardness approaching that of a diamond, and will readily scratch agate.

Varying percentages of carbon will increase or decrease the hardness but an excess of carbon will diminish the toughness of the alloy.

The percentage of carbon may vary up to 7% as different degrees of hardness may be required for the purpose in view.

Likewise the percentage of beryllium may vary. However for lathe tools I find about 5.5% to be the best suited.

Beryllium is not reducible by hydrogen. Owing to the presence of beryllium the carbon content may be reduced to below 3%. Lower carbon means a much tougher alloy, while a cobalt alloy requires a much higher percentage of carbon to obtain the necessary hardness.

What I desire to claim is:—

1. An alloy comprising eighty parts of tungsten carbide having a carbon content of not exceeding seven percent and beryllium four and one half parts.

2. An alloy comprising beryllium about five and one half percent; carbon about two and eight-tenths percent, and the remainder tungsten.

3. An alloy consisting mainly of tungsten carbide and containing an appreciable amount of beryllium in minor quantities.

4. A sintered, hard and tough metal composition consisting mainly of tungsten carbide and containing an appreciable amount of beryllium in minor proportion.

5. A sintered, hard and tough composition consisting substantially of tungsten carbide and beryllium, the beryllium forming not over 5.5% of the total content of the composition.

6. A sintered, hard and tough composition consisting substantially of tungsten, carbon and beryllium in which the carbon content is below 7% and the beryllium content does not exceed 5.5% of the entire composition.

7. A sintered, hard and tough composition consisting substantially of tungsten, carbon and beryllium in which the carbon content is below 3% and the beryllium content does not exceed 5.5% of the entire composition.

Signed at Latrobe, Pa., this 19th day of January, 1929.

PHILIP M. McKENNA.